(12) United States Patent
Whaley, Jr. et al.

(10) Patent No.: US 7,082,249 B2
(45) Date of Patent: Jul. 25, 2006

(54) LOW OPTICAL OVERLAP MODE (LOOM) WAVEGUIDING SYSTEM AND METHOD OF MAKING SAME

(75) Inventors: Ralph D. Whaley, Jr., Princeton Junction, NJ (US); Joseph H. Abeles, East Brunswick, NJ (US); Martin H. Kwakernaak, New Brunswick, NJ (US); Viktor B. Khalfin, Hightstown, NJ (US); Winston K. Chan, Princeton, NJ (US); Haiyan An, Plainsboro, NJ (US); Steven Lipp, West Windsor, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 11/091,186

(22) Filed: Mar. 28, 2005

(65) Prior Publication Data

US 2005/0259937 A1 Nov. 24, 2005

Related U.S. Application Data

(60) Provisional application No. 60/578,680, filed on Jun. 10, 2004, provisional application No. 60/556,730, filed on Mar. 26, 2004.

(51) Int. Cl.
G02B 6/10 (2006.01)
(52) U.S. Cl. ............... 385/132; 385/129; 385/130; 385/131; 438/31; 438/32
(58) Field of Classification Search ........ 385/129–132; 438/29, 31–32
See application file for complete search history.

(56) References Cited

U.S. PATENT DOCUMENTS

| 4,789,642 | A | * | 12/1988 | Lorenzo et al. ............... 438/31 |
| 4,805,184 | A | * | 2/1989 | Fiddyment et al. ............ 372/96 |
| 5,438,637 | A | | 8/1995 | Nilsson et al. |
| 5,838,869 | A | | 11/1998 | Rasch et al. |
| 6,232,141 | B1 | * | 5/2001 | Kusakabe .................... 438/57 |
| 2002/0060316 | A1 | * | 5/2002 | Matsuyama .................. 257/12 |
| 2003/0201851 | A1 | * | 10/2003 | Yoshida et al. ............. 333/246 |

OTHER PUBLICATIONS

D. P. Kelly, et al., "Monolithic Suspended Optical Waveguides for InP MEMS", IEEE Photonics Tech. Letters, May 2004, pp. 1298-1300, V. 15, No. 5.
K. C. Lee, "The Fabrication of Thin, Freestanding, Single-Crystal, Semiconductor Membranes", Journal of the Electrochemical Society, 1990, pp. 2556-2574, V. 137, No. 8.
S.T. Ho, et al., "High Index Contrast Mirrors for Optical Microcavities", Appl. Phys. Lett., 1990, pp. 1387-1389, V. 57, No. 14.
D.R. Dykar, "Ultrafast Coplanar Air-Transmission Lines", App. Phys. Lett., 1990, pp. 1123-1125, vol. 57, No. 11.

* cited by examiner

*Primary Examiner*—Brian Healy
*Assistant Examiner*—Eric Wong
(74) *Attorney, Agent, or Firm*—Lowenstein Sandler PC

(57) ABSTRACT

An optical system including: a substrate having a recess; and, a substantially planar, semiconductor waveguiding membrane suspended over the recess and having a thickness less than about 200 nm; wherein, the optical system supports a propagating optical mode having a majority of its energy external to the semiconductor waveguiding membrane.

20 Claims, 8 Drawing Sheets

LOW OPTICAL OVERLAP MODE (LOOM) WAVEGUIDING SYSTEM AND METHOD OF MAKING SAME

RELATED APPLICATIONS

This Application claims priority of U.S. patent application Ser. Nos. 60/556,730, filed Mar. 26, 2004, entitled LOW-OVERLAP-OPTICAL-MODE (LOOM) WAVEGUIDES (LOOM-GUIDES) and Ser. No. 60/578,680, filed Jun. 10, 2004, entitled LOW-OPTICAL-OVERLAP MODE (LOOM) WAVEGUIDES (LOOM-GUIDES), the entire disclosures of which are each hereby incorporated by reference as if being set forth in their respective entireties herein.

GOVERNMENT RIGHTS

The invention was made with U.S. government support, and the U.S. Government has certain rights in the invention, as provided for by the terms of contract number DAAD17-02C-0089 (DARPA).

FIELD OF INVENTION

The present invention relates generally to optical systems, and more particularly to optical waveguides and devices.

BACKGROUND OF THE INVENTION

Waveguides generally support well-defined modes. Waveguides may typically allow storage, conversion and transmission of energy and information in physical excitations that exhibit wave-like properties. Non-ideal properties of conventional waveguides may generally be classified into: scattering (into other modes of the same elementary excitation), nonlinear conversion (again, into other modes of the same elementary excitation), dispersion (dependence of wave properties on excitation energy), polarization (the interaction of multiple substantially identical wave excitations of the same type) and absorption (i.e., transfer of energy to modes of other elementary excitations). Photonic waveguides, such as planar optical dielectric waveguides, are typically composed of materials such as glass, compound semiconductors, silicon-based materials and polymers.

It is believed to be desirable to reduce scattering and absorption in photonic waveguides in order to decrease losses in propagating modes. Waveguides exhibiting such reductions may be attractive for use with low-loss optical delay lines in on-chip photonic circuits for analog optical signal processing, for example. Such waveguides may also prove particularly useful in high power semiconductor amplifiers and lasers, such as amplifiers and lasers for telecommunications and directed-energy applications. High-efficiency electro-optic modulators well suited to introduce photonic signals into RF systems and provide more powerful signal processing capability and lighter weight, smaller size and wireless capabilities may also benefit from such waveguides. Further, more-nearly ideal photonic oscillator sources, such as sources that exhibit narrow line-width, high-spectral purity oscillators, and ultra-low-jitter pulsed sources may be achievable. Such devices would be useful for advanced signal processing and communications applications that introduce the advantages of digital signal processing into domains conventionally served by analog systems. Some examples include software radio, secure communications, high-spectral-efficiency communications, low-probability-of-intercept communications, spread-spectrum radar/synthetic-aperture-radar, and laser ranging/imaging.

SUMMARY OF INVENTION

An optical system including: a substrate having a recess; and, a substantially planar, semiconductor waveguiding membrane suspended over the recess and having a thickness less than about 200 nm; wherein, the optical system supports a propagating optical mode having a majority of its energy external to the semiconductor waveguiding membrane.

BRIEF DESCRIPTION OF THE FIGURES

Understanding of the present invention will be facilitated by consideration of the following detailed description of the preferred embodiments taken in conjunction with the accompanying drawings, wherein like numerals refer to like parts and.

DETAILED DESCRIPTION OF THE PREFERRED EMBODIMENTS

Figure 1:
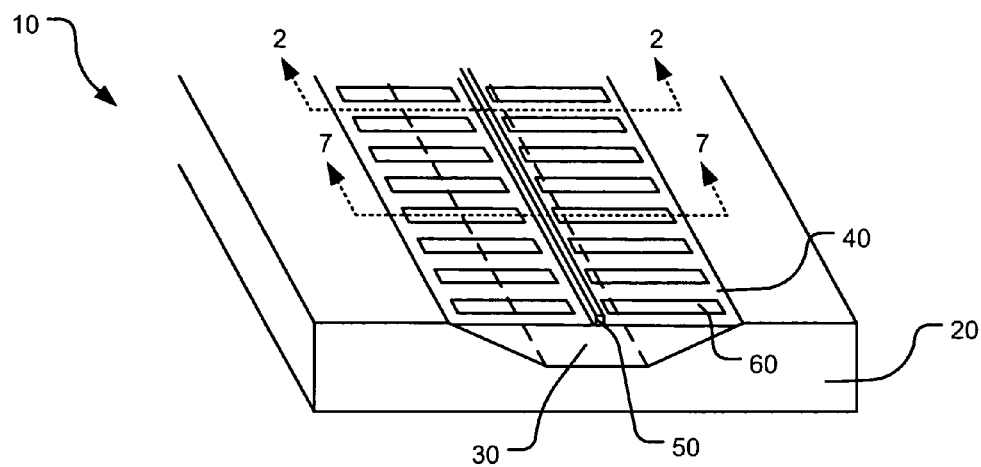
FIG. 1 illustrates a perspective view of a waveguide structure according to an aspect of the present invention.

It is to be understood that the figures and descriptions of the present invention have been simplified to illustrate elements that are relevant for a clear understanding of the present invention, while eliminating, for purposes of clarity, many other elements found in typical optical systems and methods of making and using the same. Those of ordinary skill in the art will recognize that other elements are desirable and/or required in order to implement the present invention. However, because such elements are well known in the art, and because they do not facilitate a better understanding of the present invention, a detailed discussion of such elements is not provided herein.

According to an aspect of the present invention, waveguides supporting a low optical overlap mode (LOOM) may be provided. Such waveguides (LOOM-guides) may provide for around 90%, or more, of propagating wave energy to be located in a low-density medium, such as a vacuum, gas or plasma. Low waveguide propagation loss (due to absorption and/or scattering), low non-linearity, low dispersion and polarization properties may result.

In conventional, real-index electromagnetic waveguides, modes are substantially coincident with a dielectric material which may typically take the form of a III–V semiconductor, like AlGaAs or InGaAsP. Advantages of conventional waveguides include relative ease of fabrication, and good isolation of the mode from environmental influences. However, the non-ideal properties of such waveguides include a minimum propagation loss determined by the material loss, minimum nonlinearity determined by material nonlinearity, and scattering determined by unintentional variations in index introduced during fabrication. Additionally, certain polarization properties not ideal for some applications may be inherent to conventional waveguides.

In contrast, in a LOOM-guide the optical mode is not substantially coincident with the dielectric material in a waveguide. The overlap factor with respect to dielectric material in conventional waveguides is approximately 100%. But, in LOOM-guides the overlap factor may be reduced, such as to about 5% or less. Accordingly, the overwhelming preponderance of wave energy does not travel in the dielectric material in a LOOM-guide, but in the surrounding material, such as air or a vacuum. As a direct consequence, LOOM-guides exhibit dramatically lower loss, lower nonlinearity, decreased scattering, reduced dispersion, and different polarization properties than may be attainable using conventional dielectric guiding.

As will be appreciated by those possessing an ordinary skill in the art, direct bandgap materials, such as InP and InGaAsP, offer not only flexibility in the integration of photonic components, but also unique electro-optic control over both real and imaginary refractive indices unmatched in other platforms, such as silicon, lithium niobate and polymer. This index control allows for enhanced functionality, such as high-speed switching for agile beamforming, filter tuning, and adaptive filtering. Due to the availability of fabrication processes exhibiting strong material selectivity, an InP system is a particularly attractive candidate for system miniaturization. However, semiconductor material loss has historically been a shortcoming of this material system, typically having values in the range of 0.1 to 1 $cm^{-1}$.

However, a LOOM-guide may typically include a material in which the wave travels more slowly than the surrounding low loss medium, such as a vacuum or air cladding, and in which the overlap factor of the mode is 5% or less with respect to that material. Thus, losses may be reduced by 20 times or more. Since material losses limit the minimum loss that can be attained, the use of a LOOM design has the effect of reducing material loss minimums, allowing for low loss propagation to be achieved. For example, in a material characterized by 0.1 $cm^{-1}$ material losses, a 5% LOOM-guide may be used to advantageously reduce the loss limit to around 0.005 $cm^{-1}$.

According to an aspect of the present invention, the problem of semiconductor propagation loss may be mitigated by exploiting nanotechnology to reduce the overlap of the optical mode with the semiconductor material. For example, a thin (such as around 50 nm or less) InP rib-loaded membrane which propagates a TM low optical overlap mode (LOOM) having a majority, such as greater than 99%, of the field energy in a surrounding medium, such as air, rather than the semiconductor itself may be provided. This yields a true propagating mode with loss on the order of 0.001 $cm^{-1}$, resulting in a two order of magnitude reduction in semiconductor waveguide loss. Additionally, the LOOM itself has much greater mode size due to its low confinement, and thus may be itself a closer match to optical fiber modes than traditional semiconductor waveguided modes, leading to efficient fiber coupling.

Figure 2:
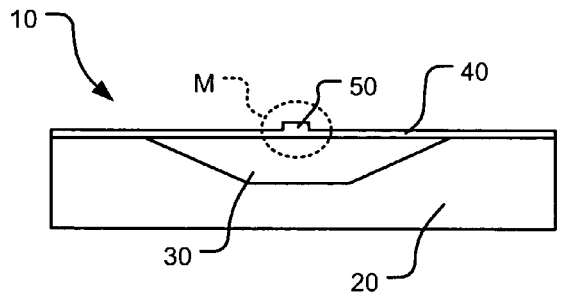
FIG. 2 illustrates a cross-sectional view of the waveguide structure of FIG. 1 and a transverse magnetic low optical overlap mode according to an aspect of the present invention.

Referring now to FIGS. 1 and 2, there are shown a waveguide structure 10 according to an aspect of the present invention. The view of FIG. 2 corresponds to section 2—2 of FIG. 1. Waveguide structure 10 supports low optical overlap modes, and hence is referred to as a LOOM-guide. LOOM-guide 10 generally includes a substrate 20, recess 30, membrane 40 and rib 50. In the illustrated embodiment, LOOM-guide 10 also includes membrane apertures 60. In the illustrated case, apertures 60 provide accessibility to the recess 30 volume during fabrication of LOOM-guide 10.

By way of non-limiting example only, substrate 20, membrane 40 and rib 50 may all take the form of InP. Other material systems may be used. For example, membrane 40 may take the form of InGaAsP where rib 50 takes the form of $Si_3N_4$ and a compatible substrate is provided. Regardless of the particulars, substrate 20 is preferably thick enough to define recess 30 (which may be on the order of greater than about 12 μm deep and around 30 μm deep, for example) and physically support membrane 40 and rib 50. Membrane 40 may be on the order of about 50 nm thick. Rib 50 may be on the order of about 50 nm thick and about 3 μm wide.

Membrane 40 provides a wave-guiding core having a thickness substantially less than the wavelength of light to be propagated (e.g., around 1550 nm). As a result, propagating light travels substantially externally to the wave-guiding core and in a lower loss medium, such as surrounding air or a surrounding vacuum within recess 30 and over membrane 40. A real index guiding structure, such as rib 50, may help further confine propagating light to a central lateral region of the membrane 40 core. For example, rib 50 may serve to substantially confine propagating light to a substantially central lateral region substantially adjacent to rib 50 and transversely between apertures 60. For non-limiting purposes of explanation only, a detailed discussion regarding field propagation and semiconductor membranes may be found in "The Fabrication of Thin, Freestanding, Single-Crystal, Semiconductor Membranes", by Kevin C. Lee of the National Institutes of Standards and Technology, Journal of the Electrochemical Society, Volume 137, Number 8, Pp. 2556–2574 (1990).

Figure 3:
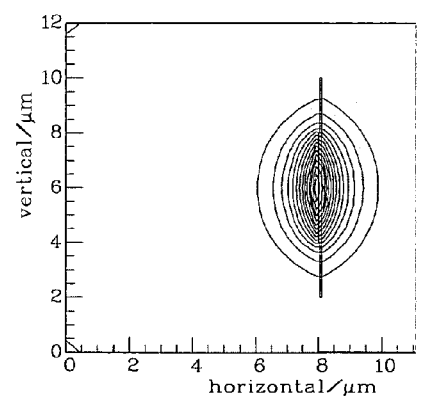
FIG. 3 illustrates an exemplary transverse magnetic low optical overlap mode (being rotated 90 degrees) according to an aspect of the present invention.

A transverse magnetic (TM) field of propagating light may form LOOM M, as is shown in FIG. 2 by way of non-limiting example only. Referring now also to FIG. 3, there is shown a TM low overlap optical mode (LOOM) exhibiting less than one percent (1%) modal overlap with an InP membrane and rib. In the illustrated case, the rib width is 4 μm, rib thickness is 50 nm and membrane thickness is 50 nm. The image has been rotated 90 degrees. As will be understood by those possessing an ordinary skill in the pertinent arts, the transverse electric (TE) field may also be used, such as by reducing the thicknesses of membrane 40 and rib 50 to around 10 nm each, for example.

Figure 4:
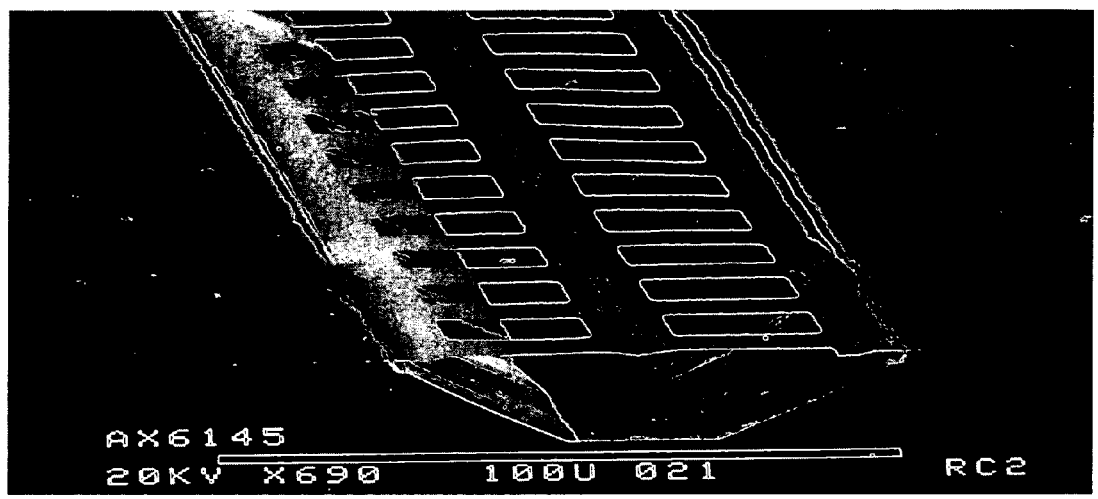
FIG. 4 illustrates a perspective SEM view of an InP waveguide structure according to an aspect of the present invention.

Referring now also FIG. 4, there is shown a scanning electron microscope (SEM) representation of a waveguide structure analogous to the LOOM-guide structure 10 of FIG. 1. The waveguide structure of FIG. 4 includes a 50 nm thick InP rib upon a 50 nm thick InP membrane over a chemically etched v-groove in an InP substrate. Of course, changes to the particular structure, such as membrane waveguides with around 10 nm to around 100 nm thick ribs, may be used. In the case of a 100 nm thick rib, propagation losses may be on the order of about 0.0007 $cm^{-1}$, for example.

Figure 5:
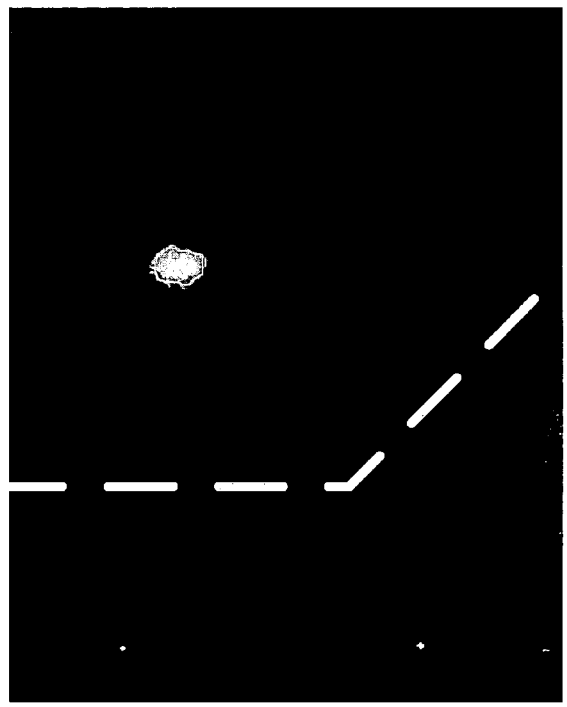
FIG. 5 illustrates a cross-sectional view of a propagating low optical overlap mode in the waveguide structure of FIG. 4.

Referring now also to FIG. 5, there is shown a cross-sectional view of a propagating low optical overlap mode in the waveguide structure of FIG. 4. As may be seen therein, the propagating mode is substantially confined to a substantially central region of membrane 40 and a low-loss medium above and below membrane 40 (e.g., within recess 30).

Figure 6:
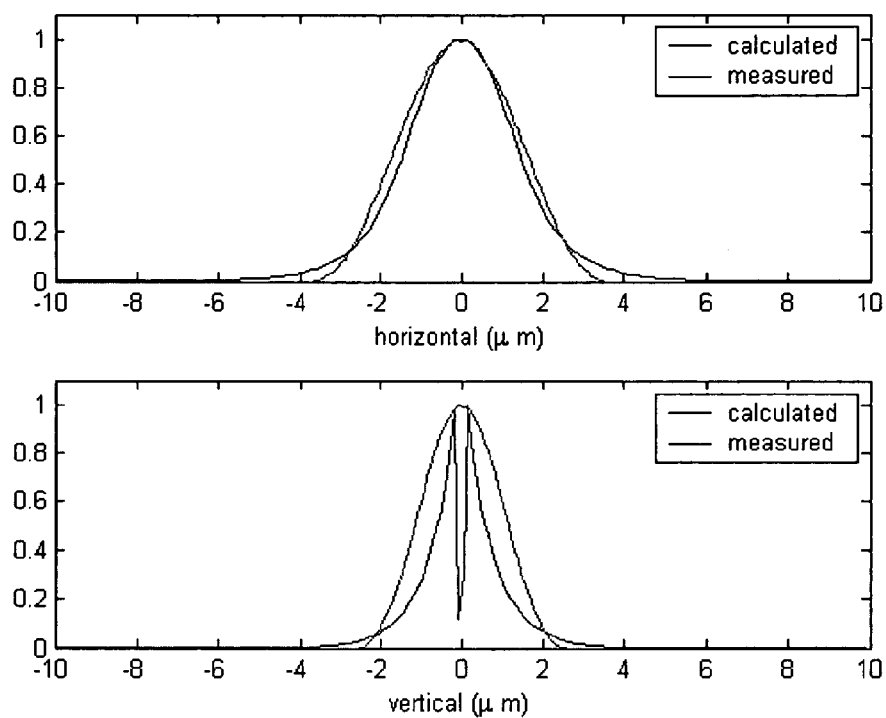
FIG. 6 illustrates a comparison of calculated and measured intensity values corresponding to low optical overlap mode propagating waveguides according to an aspect of the present invention.

Referring now also FIG. 6, there is shown a comparison of predicted and measured results corresponding to LOOM-guides according to an aspect of the present invention. As is shown therein, the full width at half maximum (FWHM) in the horizontal direction may be predicted to be about 3.37 µm. A FWHM in the horizontal direction of about 2.95 µm may be readily achieved. The FWHM in the vertical direction may be predicted to be about 1.2 µm. A FWHM in the vertical direction of about 2.3 µm may be readily achieved. Thus, the low propagation loss of conventional fiber optics (0.2 dB/km=$2\times10^{-6}$ dB/cm~$5\times10^{-7}$ $cm^{-1}$) may be approached using LOOM-guides according to the present invention. The low-loss of the LOOM-guides implies a high power-handling capability which is confirmed, in effect, by the concomitant reduction in nonlinearity of such waveguides (according to the identical principle of reduced overlap with nonlinear, e.g., semiconductor).

According to an aspect of the present invention, a variety of materials may be incorporated with a LOOM-guide. Because the membrane is suspended, an introduced material may be of lower index as compared to the semiconductor membrane. For conventional waveguides, introducing a lower index material (e.g., silicon dioxide or glass) will have little or no effect on the guided mode. However, the free-space, suspended or free-standing geometry of the LOOM-guide eliminates the confinement of the mode to the semiconductor, permitting the mode to be transferred to a lower index material which is, in effect, superimposed on the LOOM guide.

By way of non-limiting example, a glass rib may be applied to a LOOM guide membrane. Glass possesses certain advantages as compared to other materials, for example the ability to reflow under irradiation at 10.6 microns to provide an ultra-smooth morphology. Ultra-low-loss glass waveguide properties can be attained on a LOOM-guide by using ultra-smooth ribs, which may serve to facilitate energy routing and transfer in a planar geometry.

Further, a LOOM-guide may be made to include light-emitting region(s) by providing quantum wells or similar emitting structures within membrane 40. The low-loss and low non-linearity of the LOOM-guide are well suited for realizing high power pulsed laser sources, notwithstanding thermal limitations imposed by the free-standing geometry. Such benefits of the LOOM-guide may primarily result from the nature of the expansion of the physical extent of the LOOM waveguide laser as compared to that of a conventional dielectric waveguide laser, such as a diode laser, for example.

LOOM-guides may be well suited for being coupled to or from-other waveguides, due to the expanded mode inherently present. For example, a LOOM-guide may be well suited for being butt-coupled to a lensed fiber. However, conventional mode transition features may be used to facilitate light energy passing between a LOOM-guide and a conventional waveguide with low loss.

Figure 7A:
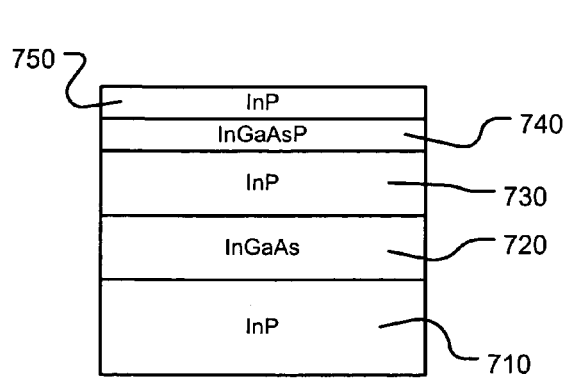
FIGS. 7A–7D illustrate a sectional view of a waveguide structure at various processing steps according to an aspect of the present invention.
Figure 7B:
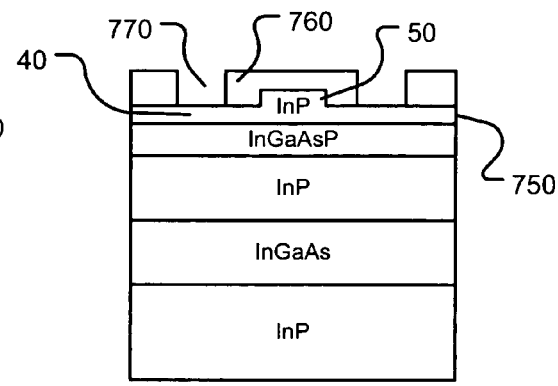

Referring now also to FIGS. 7A–7D, there is shown a waveguide structure at various processing steps according to an aspect of the present invention. The views of FIGS. 7A–7D may be seen to correspond to section 7—7 of FIG. 1. Referring first to FIG. 7A, an InP substrate 710 may be provided with an InGaAs layer 720, InP layer 730, 1.25Q InGaAsP layer 740 and InP layer 750. Substrate 710 may be sufficiently thick to support the remaining layers and provide for an internal recess (e.g., 30, FIGS. 1, 7D). Layer 720 may be on the order of about 2 µm thick. Layer 730 may be on the order of about 300 nm thick. Layer 740 may be on the order of about 50 nm thick. And, layer 750 may be on the order of about 100 nm thick, where membrane 40 and rib 50 are each to be about 50 nm thick (FIGS. 1, 7B).

Referring now also to FIG. 7B, layer 750 may be patterned to provide membrane 40 and rib 50. For example, a processing mask (not shown), such as a dielectric mask like a $SiN_x$ mask, may be provided over layer 750. This mask may be patterned (such as by using a contact photolithographic mask and processing) to selectively protect an area of layer 750 corresponding to rib 50, and facilitate selective thinning of portions of layer 750 around the protected region—effectively defining rib 50 and thinning membrane 40. The selective thinning may use dilute wet chemical etching, such as a dilute HCL-Phosphoric acid wet etch, to remove about 50 nm of layer 750, by way of non-limiting example only. FIG. 7B illustrates the structure of FIG. 7A, where layer 750 has been selectively thinned to form an about 50 nm thick ridge 50 and an about 50 nm thick membrane 40.

Figure 7C:
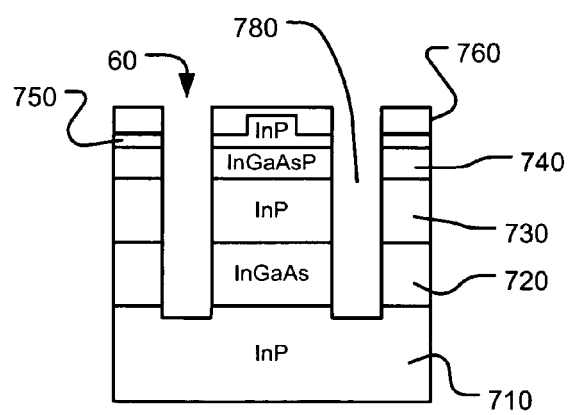
Figure 7D:
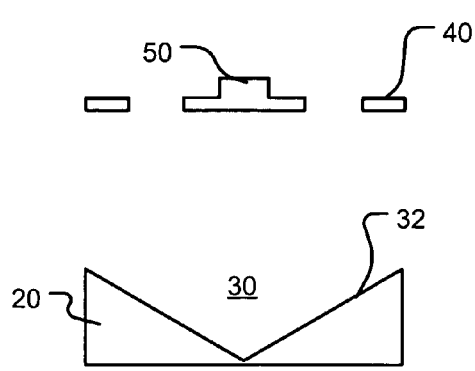

Referring still to FIG. 7B and now also to FIG. 7C, a mask 760 may be provided over the rib 50/membrane 40 patterned layer 750. Mask 760 may also take the form of a dielectric mask like a SiNx mask, for example. Layer 760 may be patterned (such as by using a contact photolithographic mask and processing) to facilitate processing access to layers 710–740. For example, mask 760 may have openings 770 that correspond to apertures 60 (FIGS. 1, 7D). Layer 760 may be used as a mask to selectively reactive ion etch (RIE) vias 780 through layers 740, 730, 720 and into layer 710. For example, conventional methane ($CH_4$) based deep reactive ion etching (DRIE) may be used. Conventional $O_2$ descumming process(es) may be used to reduce RIE polymer buildup, for example. Further, a resist layer may be kept atop the dielectric, to provide a buffer between the polymer and nitride.

Referring now also to FIG. 7D, the DRIE etched vias may be used to chemically release those portions of layers 710, 720, 730 and 740 corresponding to recess 30. By way of non-limiting example, Caro's acid ($H_2SO_4$ and $H_2O_2$) may be introduced into vias 780 and used to chemically release portions of layer 720. An HCl-Phosphoric acid wet etch may then be used to chemically release portions of layers 730 and 710. As will be understood by those possessing an ordinary skill in the arts, such an etch is [211] plane selective, such that recess 30 will have sloped sidewalls 32 naturally resulting from the wet etch of layer 710. Portions of layer 740 may be removed using Caro's acid, for example. The remaining portions of layer 760 may be removed in any conventional manner, such as by using HF, for example.

According to an aspect of the present invention, the structure may then be critically dried to mitigate "stiction", where the membrane is pulled down to the substrate and attached via Van der Waals forces should it be exposed to a fluid/air interface. Without critical drying, the membrane 40 may fracture. Basically, boundaries between solid, liquid and vapor phases meet at the triple point on the phase diagram. Along the boundary between the liquid and vapor phases, a particular temperature and corresponding pressure may be found where liquid and vapor can co-exist and hence have the same density. Critical point drying relies on this physical principle. According to an aspect of the present invention, the structure may be immersed in methanol ($CH_3$—O—H). The methanol may then be replaced with super-fluid $CO_2$. When the temperature is raised above the critical temperature, the super-fluid $CO_2$ changes to vapor without change of density. Because the density does not change, undesirable surface tension effects which may distort and/or fracture membrane 40 may be avoided.

To further mitigate the risk of membrane damage during processing low stress $SiN_x$ may be used as a dielectric masking material. Otherwise, membrane damage may occur during nitride removal. The compressive or tensile stress of a PECVD'd $SiN_x$ layer is dependent upon the pressure of the PECVD chamber during deposition. According to an aspect of the present invention, the pressure in a PECVD chamber during $SiN_x$ mask deposition may be suitable for depositing a slightly tensile $SiN_x$ layer. For example, the pressure may be between about 250 and 300 mT, and preferable around 275 mT, to provide a low-stress nitride mask.

Figure 8:
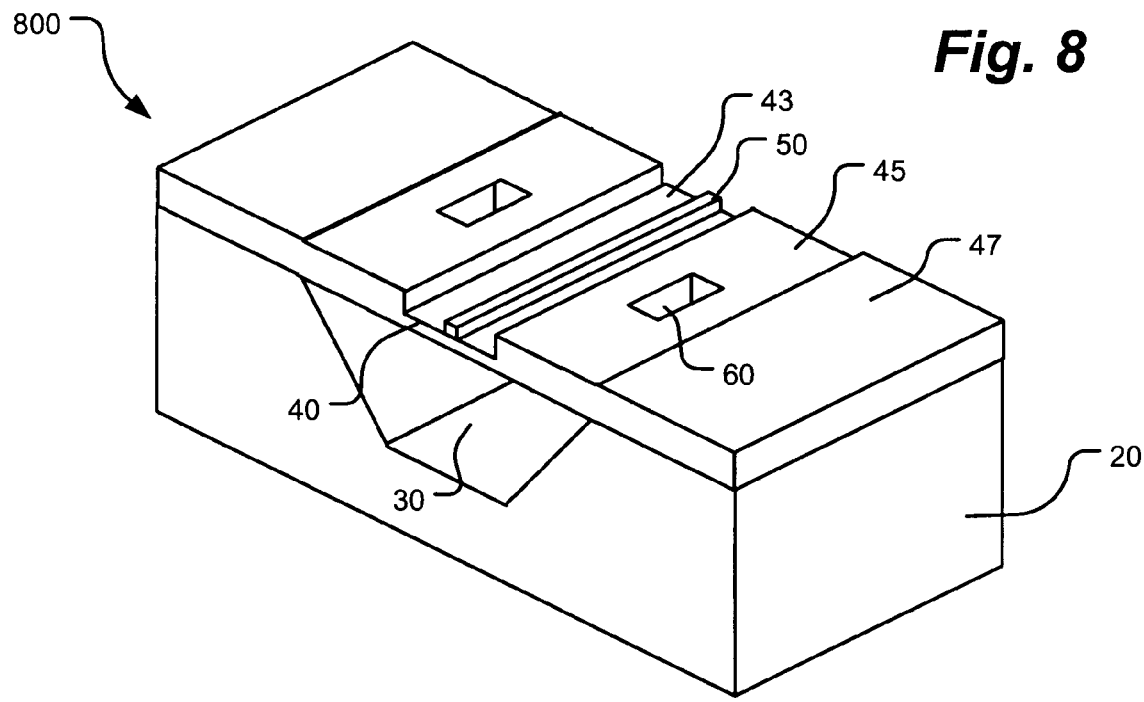
FIG. 8 illustrates a perspective view of a waveguide structure according to an aspect of the present invention.

Referring now also to FIG. 8, there is shown a waveguide structure 800 according to an aspect of the present invention. Like structure 10, waveguide structure 800 supports low optical overlap modes, and hence is also referred to as a LOOM-guide. Like references in FIGS. 1 and 8 designate like elements of the invention, so that a detailed discussion of them need not be repeated. Membrane 40 of LOOM-guide 800 includes a portion thinner than another portion. In the illustrated case, three portions 43, 45 and 47 are provided. Portion 43 is the thinnest, and functionally corresponds to waveguiding membrane 40 of structure 10. Portions 45, 47 of membrane 40 are thicker than portion 43. Portion 43 may be on the order of about 50 nm thick, for example. Portions 45 and 47 may be on the order of about 500 nm thick, for example. As will be understood by those possessing an ordinary skill in the pertinent arts, providing a thin portion 43 supports LOOM functionality, while thicker portions 45, 47 may provide for improved structural stability of the membrane 40 in general.

Figure 9:
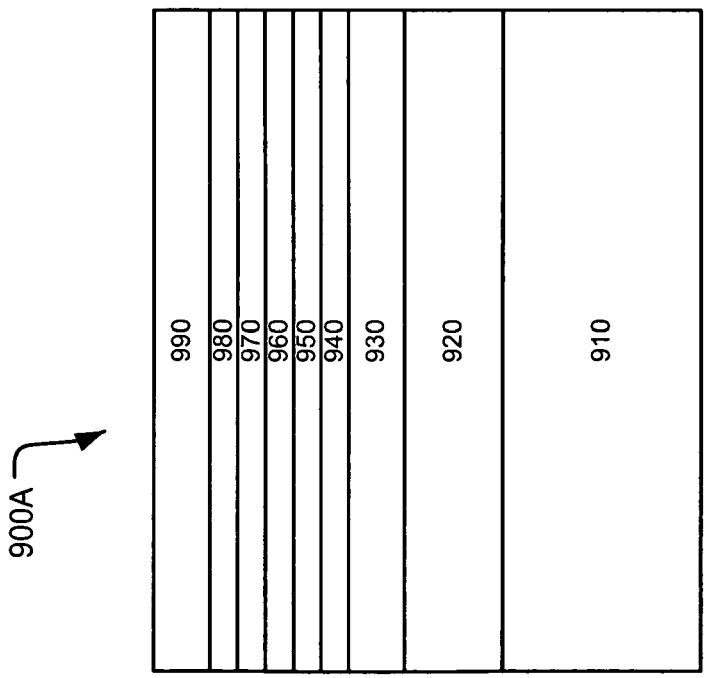
FIG. 9 illustrates a sectional view of a layer structure suitable for being patterned into the structure of FIG. 8.

Referring now also to FIG. 9, there is shown a layer structure 900A well suited for use with waveguide structure 800 of FIG. 8. Structure 900A includes a substrate 910, release layers 920, 930, 940, membrane layer 950, etch stop layer 960, rib layer 970, etch stop layer 980 and support layer 990. Substrate 910 may take the form of an InP substrate being about 350 μm thick. Release layer 920 may take the form of an InGaAs release layer being about 3 μm thick. Layer 930 may take the form of an InP release layer being about 300 nm thick. Layer 940 may take the form of an 1.25Q InGaAsP release layer being about 50 nm thick. Membrane 950 (which may serve as membrane 40 of waveguide structure 800 of FIG. 8) may take the form of an InP layer being about 50 nm thick. Layer 960 may take the form of an 1.25Q InGaAsP etch stop layer being about 50 nm thick. Layer 970 (which may serve as rib 50 of waveguide structure 800 of FIG. 8) may take the form of an InP layer being about 50 nm thick. Layer 980 may take the form of an 1.25Q InGaAsP etch stop layer being about 50 nm thick. And, layer 990 may take the form of an InP layer being about 500 nm thick.

Layer 980 may be used as an etch stop for a mask selective removal, process of portions of layer 990, such as one using a dilute HCL-Phosphoric acid wet etch to selectively thin layer 990 and provide for membrane portion(s) 43 and optionally 45 (FIG. 8). Layer 960 may be used as an etch stop for a mask selective removal process of portions of rib layer 970 (to define rib 50 of FIG. 8), such as one using a dilute HCL-Phosphoric acid wet etch. Vias may be etched though release layers 920, 930, 940 and into substrate 910 using apertures 60 (FIG. 8). The vias may be used to chemically release those portions of layers 910, 920, 930 and 940 corresponding to recess 30, analogously to the process discussed with regard to FIGS. 7A–7D.

Figure 10:
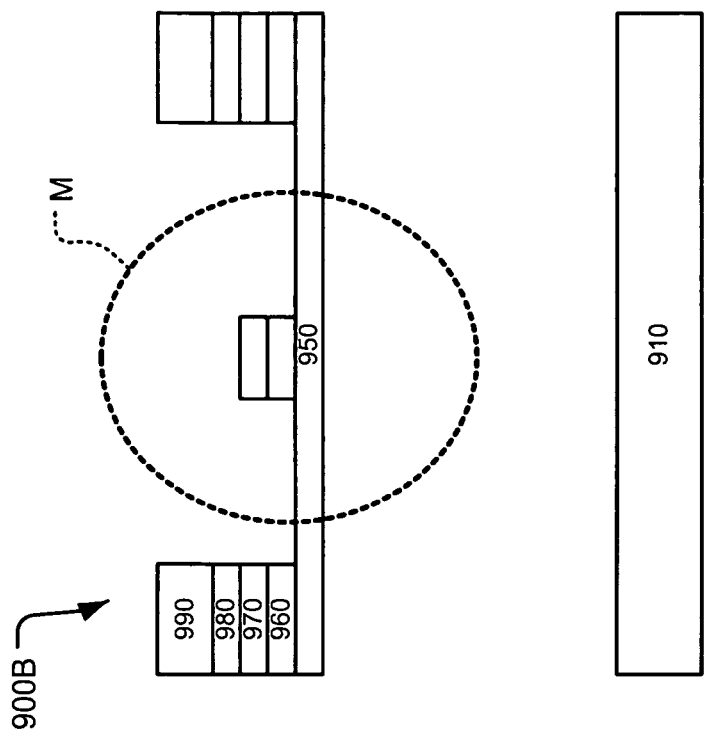
FIG. 10 illustrates a portion of the structure of FIG. 9 after processing according to an aspect of the present invention.

Referring now also to FIG. 10, there is shown a structure 900B that results from processing structure 900A. Structure 900B may be well suited for use as waveguide structure 800 (FIG. 8). Low optical overlap mode M is illustrated in FIG. 10 as well.

Figure 11:
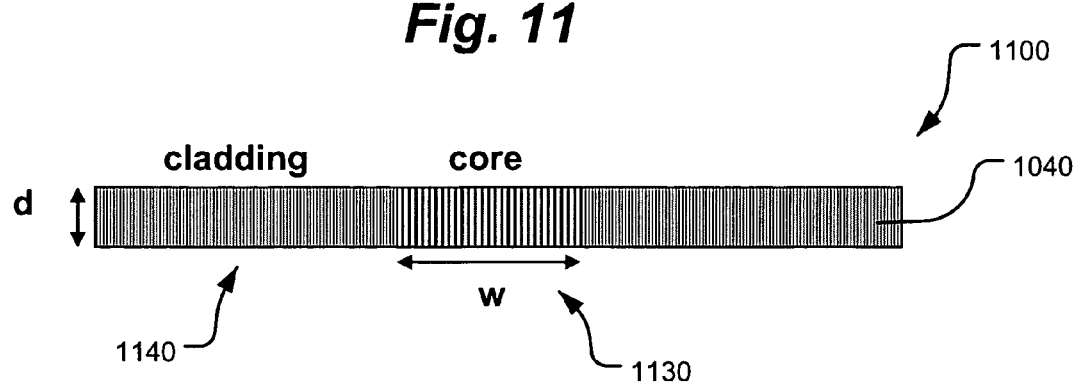
FIG. 11 illustrates a sectional view of a waveguide structure according to an aspect of the present invention.
Figure 12:
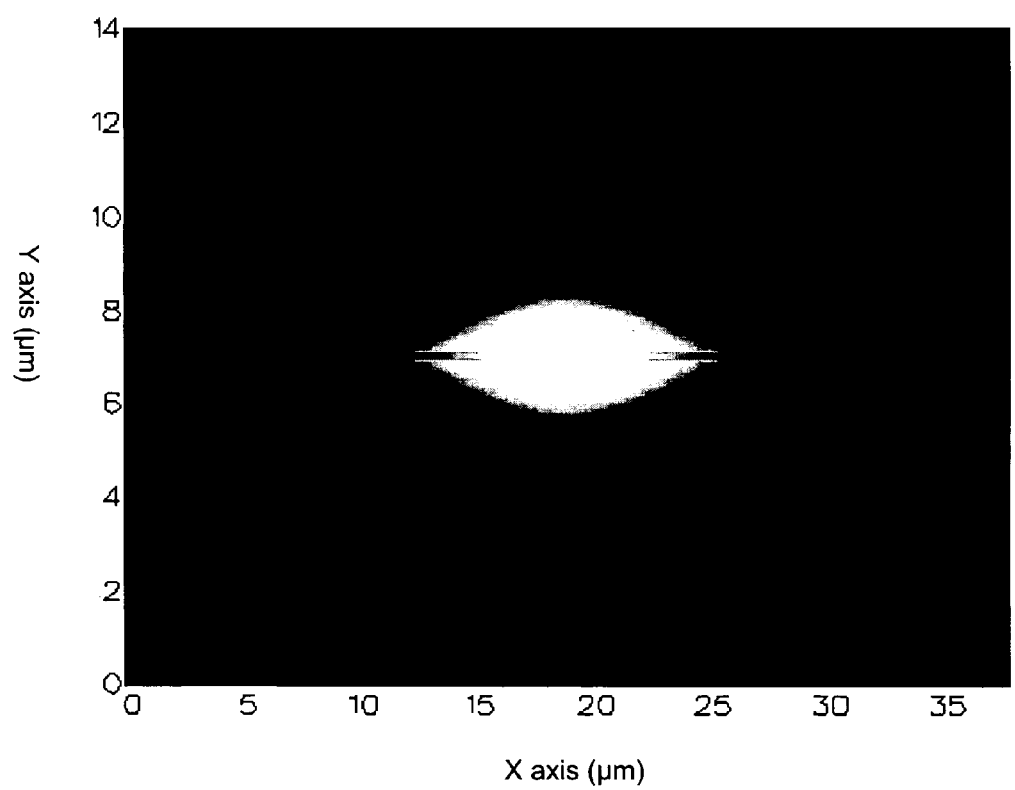
FIG. 12 illustrates a simulated mode corresponding to the waveguide structure of FIG. 11.
Figure 13:
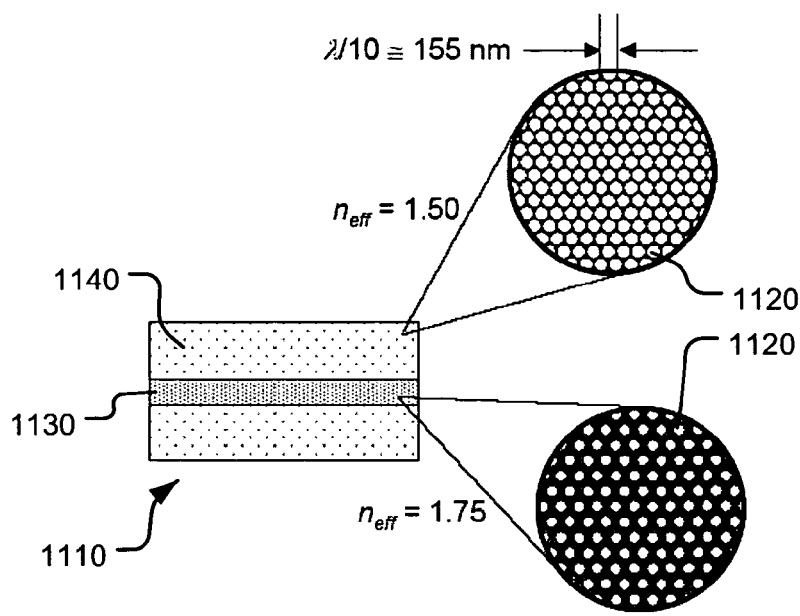
FIG. 13 illustrates a plan (top) view of the waveguide structure of FIG. 11.

Referring now also to FIG. 11, there is shown a cross-section of a waveguide structure 1100 according to an aspect of the present invention. As is shown in FIG. 12, waveguide structure 1100 supports a low optical overlap mode, and hence is also referred to as a LOOM-guide. LOOM-guide 1100 may support a propagating mode with substantially, such as about two-orders-of-magnitude, lower attenuation resulting from material absorption, as compared to a conventional semiconductor waveguide. Waveguide 1100 may take the form of a thin membrane 1110 (e.g., around 40 nm thick), and may be InP based. Membrane 1110 is functionally analogous to membrane 40 (FIG. 1). LOOM-guide 1100 may or may not include a rib to provide for transverse guiding. Membrane 1110 may have perforations 1120 therein (FIG. 13). Perforations 1120 may be in a regular pattern or not.

Perforations 1120 may be formed by selectively etching membrane 1110 dependently upon a mask, such as a contact photolithographic for example. Alternatively, microspheres or particles may be spun onto membrane 1110 and used to pattern a mask layer, for example.

By perforating the waveguiding membrane 1110, an even lower overlap factor may be achieved. Perforations 1120 may be significantly smaller in scale than the propagating wavelength in the material (e.g., 1550 nm). Consequently, perforations 1120 should not give rise to scattering loss but merely provide a realized, artificial dielectric material of lower index than the natural material from which the waveguide membrane 110 core is composed. In other words, the realized index is dependent upon the material forming membrane 1110, the amount of material missing in the perforations and the material filling the perforations (e.g., air or a vacuum).

Referring now also to FIG. 13, there is shown a plan (top) view of membrane 1110. Perforations 1120 in a region 1130 of membrane 1110 may be less dense, (e.g., have a lesser filling ratio) than those in a region 1140. Accordingly, the realized index of region 1130 may be greater than region 1140, so as to provide transverse guiding dependently upon the shape of region 1130. Region 30 may act as a waveguiding core and have a width w on the order of about 3 μm. The refractive index difference may be dependent upon the relative densities of perforations 1120 in regions 1130, 1140, upon which the effective refractive indices of the regions are dependent. For example, perforations 1120 may be about 155 nm in diameter, and have a filling ratio of about 0.60 in region 1130 (providing a refractive index of about 1.75) and a filling ratio of about 0.75 in region 1140 (providing a refractive index of about 1.5).

Figure 14:
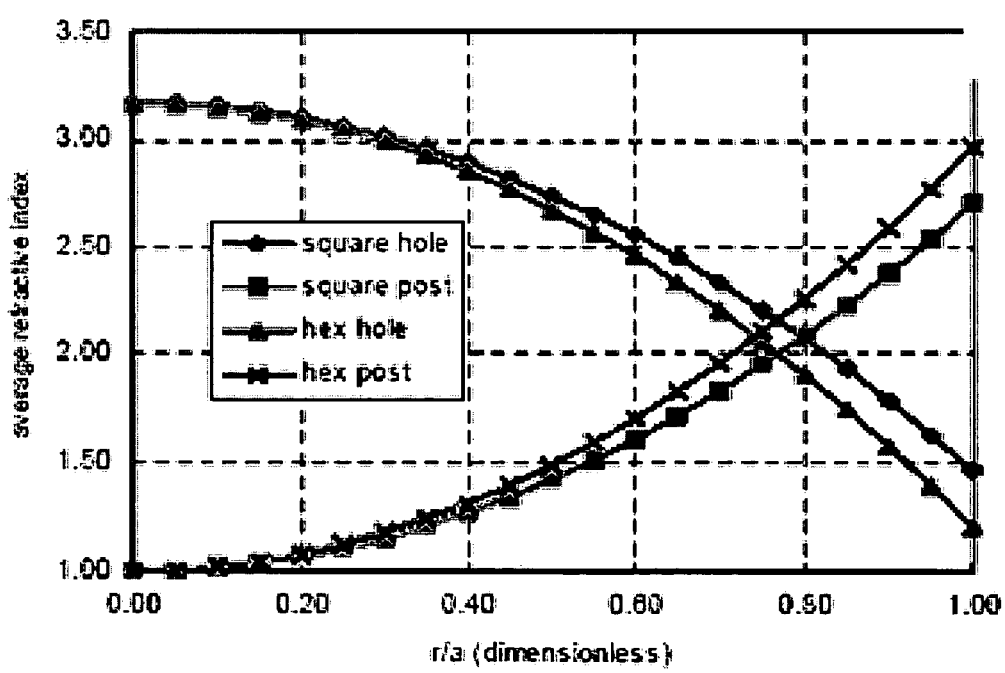
FIG. 14 illustrates a dependence of refractive index upon a filling ratio of perforations.
Figure 15:
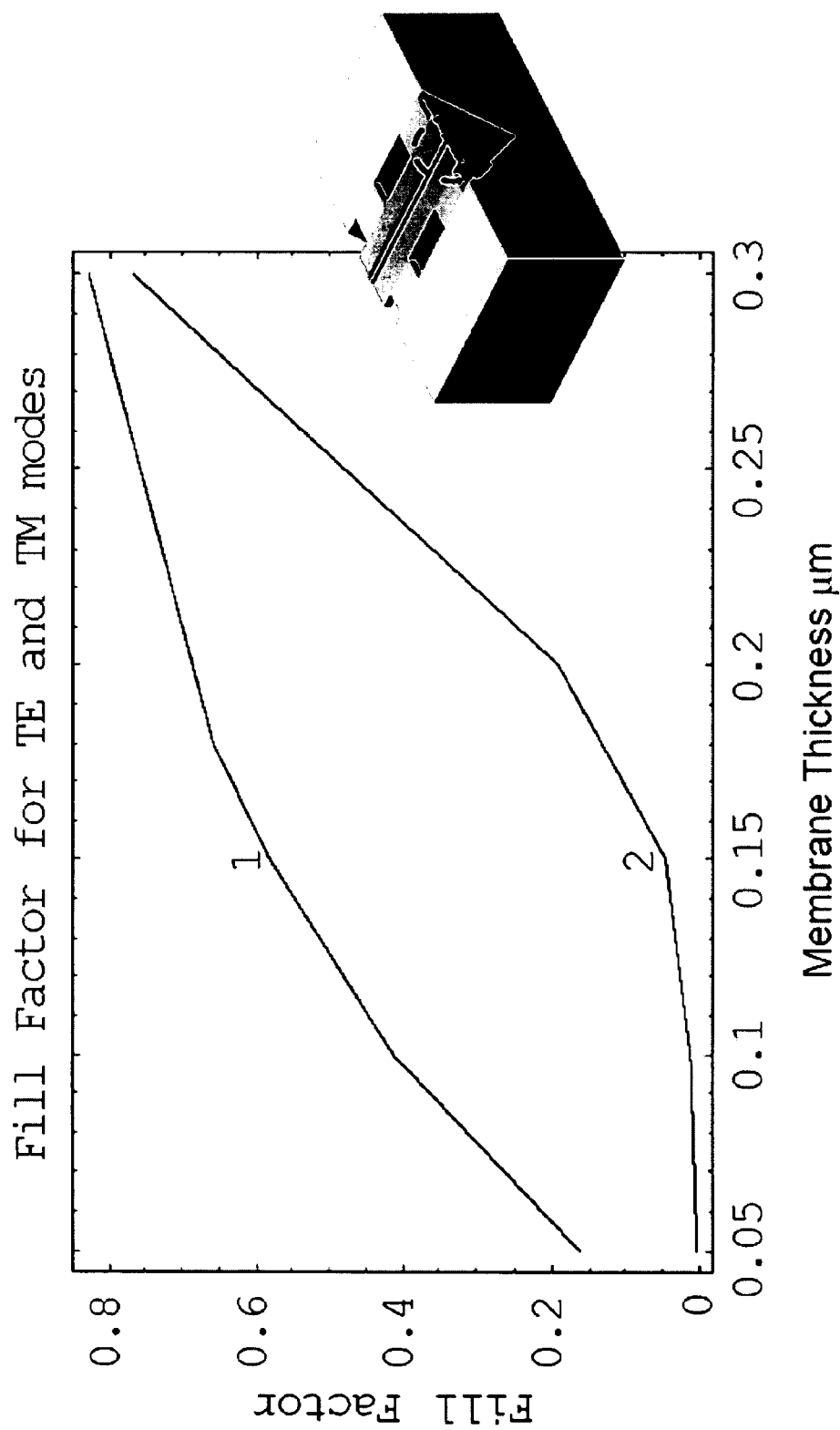
FIG. 15 illustrates a relationship between the LOOM modal fill factor and membrane thickness.

FIG. 14 illustrates achievable refractive indices using perforations of different shapes and various filling ratios. FIG. 15 illustrates a relationship between perforation fill factor and membrane thickness for TE and TM mode propagation. Reference line 1 shows an effective modal index as a function of hole density, where r=radius and a=lattice spacing of hole matrix. Reference line 2 shows an effective index as a function of post density (modeling posts instead of holes—akin to photonic band-gap materials). Calculations are indicated for lattice geometries employing both square and hexagonal lattice configurations Analogous perforations may be used with the LOOM-guide of FIG. 1 as well, for example.

It will be apparent to those skilled in the art that various modifications and variations may be made in the apparatus and process of the present invention without departing from the spirit or scope of the invention. Thus, it is intended that the present invention cover the modification and variations of this invention provided they come within the scope of the appended claims and their equivalents.

What is claimed is:

1. An optical system comprising:
   a substrate having a recess; and,
   a substantially planar, semiconductor waveguiding membrane suspended over said recess and having a thickness less than about 200 nm;
   wherein, said optical system supports a propagating optical mode having a majority of its energy external to said semiconductor waveguiding membrane.

2. The system of claim 1, further comprising a rib on said waveguiding membrane, wherein said membrane and rib provides for waveguiding of said propagating optical mode.

3. The system of claim 2, wherein said membrane and rib comprise InP.

4. The system of claim 3, wherein said substrate comprises InP.

5. The system of claim 4, wherein said substrate further comprises InGaAs.

6. The system of claim 2, wherein said membrane and rib are each about 50 nm thick.

7. The system of claim 6, wherein said recess is at least about 12 µm deep.

8. The system of claim 1, wherein said membrane comprises a plurality of portions having different thicknesses.

9. The system of claim 1, wherein said membrane is optical energy emitting.

10. The system of claim 9, wherein said membrane comprises quantum wells.

11. The system of claim 1, wherein said membrane comprises a plurality of apertures.

12. The system of claim 11, wherein said apertures are external to said propagating mode.

13. The system of claim 11, wherein said apertures have a lateral dimension less than about 400 nm.

14. The system of claim 13, wherein said apertures provide waveguiding for said propagating mode.

15. A method for making an optical system comprising:
    providing a substrate;
    forming a semiconductor membrane having a thickness less than about 200 nm over said substrate;
    etching vias through said membrane and into said substrate;
    removing a portion of said substrate being under said membrane using said vias; and,
    critically drying said membrane.

16. The method of claim 15, wherein said substrate comprises a multilayer substrate comprising InP, InGaAs and InGaAsP.

17. The method of claim 15, wherein said forming said semiconductor membrane comprises thinning a semiconductor layer to substantially simultaneously define a rib portion and said membrane.

18. The method of claim 15, wherein said etching comprises deep reactive ion etching.

19. The method of claim 15, wherein said removing comprises a chemical release.

20. The method of claim 19, wherein said chemical release is plane dependent.

* * * * *

UNITED STATES PATENT AND TRADEMARK OFFICE
CERTIFICATE OF CORRECTION

PATENT NO. : 7,082,249 B2  Page 1 of 1
APPLICATION NO. : 11/091186
DATED : July 25, 2006
INVENTOR(S) : Ralph D. Whaley, Jr. et al.

It is certified that error appears in the above-identified patent and that said Letters Patent is hereby corrected as shown below:

Col. 10, LN 27, please change:

"critically drying said membrane" to --drying said membrane with supercritical carbon dioxide--

Signed and Sealed this

Fourteenth Day of November, 2006

JON W. DUDAS
*Director of the United States Patent and Trademark Office*